US006246134B1

(12) United States Patent
Berrong et al.

(10) Patent No.: US 6,246,134 B1
(45) Date of Patent: Jun. 12, 2001

(54) APPARATUS AND METHOD FOR APPLYING TOTALLY ENCLOSED AIR-TO-AIR COOLER TO ELECTRICAL POWER GENERATOR

(75) Inventors: David Berrong, Oriedo; Calvin Paris, Orlando, both of FL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 0 days.

(21) Appl. No.: 09/349,060

(22) Filed: Jul. 7, 1999

(51) Int. Cl.[7] ......................................................... H02K 9/00
(52) U.S. Cl. .................................. 310/52; 310/54; 310/57; 310/58; 310/59; 310/62; 310/64
(58) Field of Search .................................. 310/52, 53, 54, 310/55, 56, 57, 58, 59, 62, 60, 64, 89, 91

(56) References Cited

U.S. PATENT DOCUMENTS

| | | | |
|---|---|---|---|
| 4,071,791 | * | 1/1978 | Armor et al. ............................ 310/59 |
| 4,306,165 | * | 12/1981 | Kitabayashi et al. ................... 310/59 |
| 4,348,604 | * | 9/1982 | Thode .................................... 310/62 |
| 4,508,986 | | 4/1985 | Vandamme ........................... 310/67 R |
| 4,754,179 | * | 6/1988 | Capuano et al. ........................ 310/71 |
| 4,807,354 | * | 2/1989 | Capuano et al. ........................ 29/596 |
| 5,449,036 | | 9/1995 | Genge et al. ..................... 165/104.19 |
| 5,629,573 | | 5/1997 | Ponnappan et al. .................... 310/64 |
| 5,844,333 | * | 12/1998 | Sheerin .................................. 310/52 |

FOREIGN PATENT DOCUMENTS

| | | | |
|---|---|---|---|
| 22 50 969 | * | 4/1977 | (DE) ............................... H02K/5/20 |
| 2256574 | | 12/1973 | (FR) . |
| 2087540A | | 6/1981 | (GB) . |

* cited by examiner

Primary Examiner—Nestor Ramirez
Assistant Examiner—Thanh Lam

(57) ABSTRACT

An apparatus (10) and method for applying air to cool an electrical power generator (15) is provided. The apparatus (10) preferably includes a housing (12), a power generator (15) positioned in the housing (12), and a heat transfer device (20) positioned within the housing (12) and adjacent and in fluid communication with air contacting the power generator (15) for receiving relatively hot air from the electrical power generator (15), transferringly cooling the relatively hot air with relatively cooler air received from outside the housing (12) without allowing the relatively hot air to contact and mix with the relatively cooler air, and supplying cooled air from within the housing (12) to the power generator (15). A method for cooling a power generator (15) preferably includes receiving heated air from a power generator (15) positioned within a housing (12), transferringly cooling the received heated air with cooler air received within the same housing (12) from outside the same housing (12) without mixing the received outside cooler air with the received inside heated air, and supplying cooled air to contact the power generator (15).

10 Claims, 5 Drawing Sheets

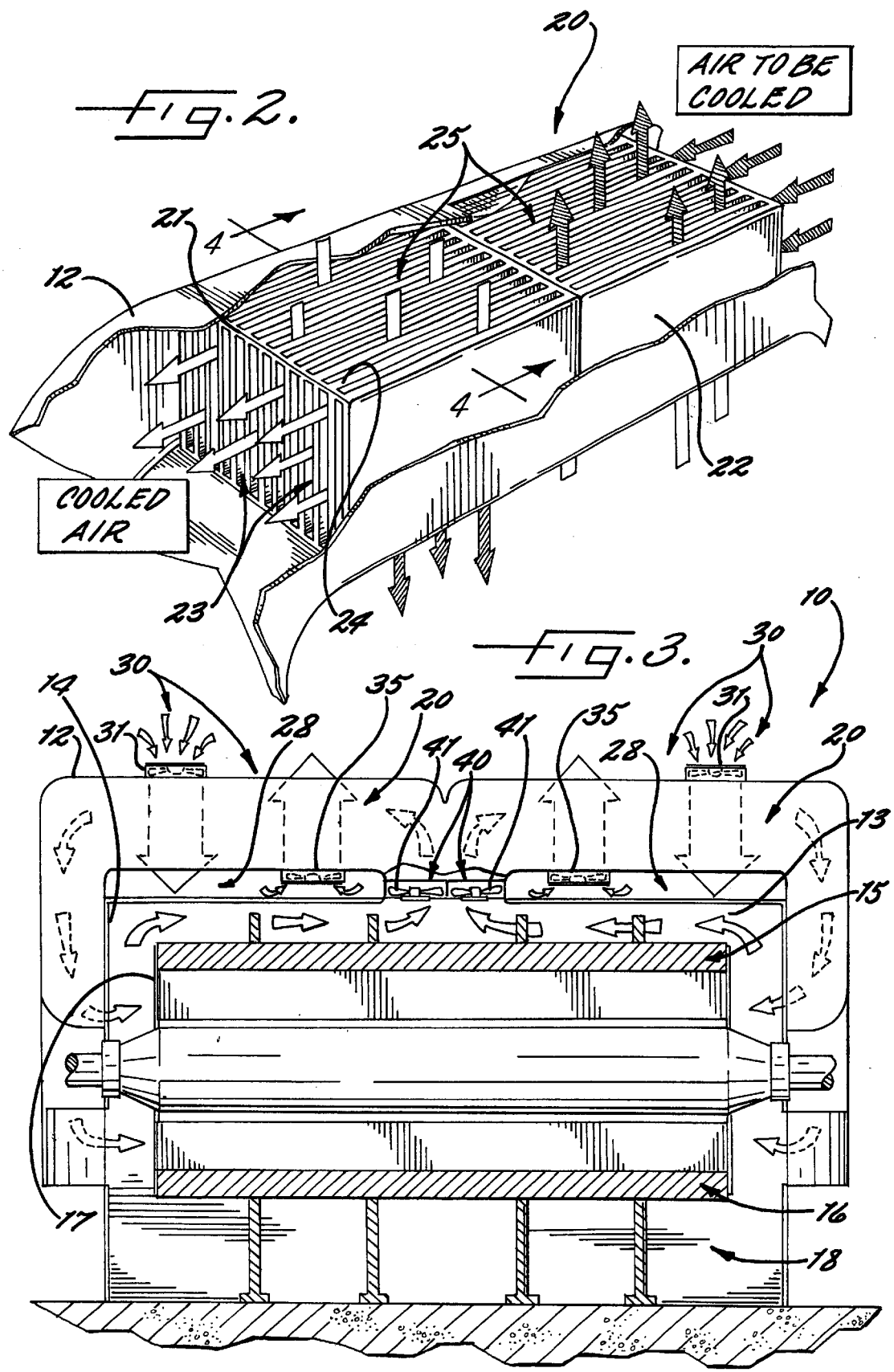

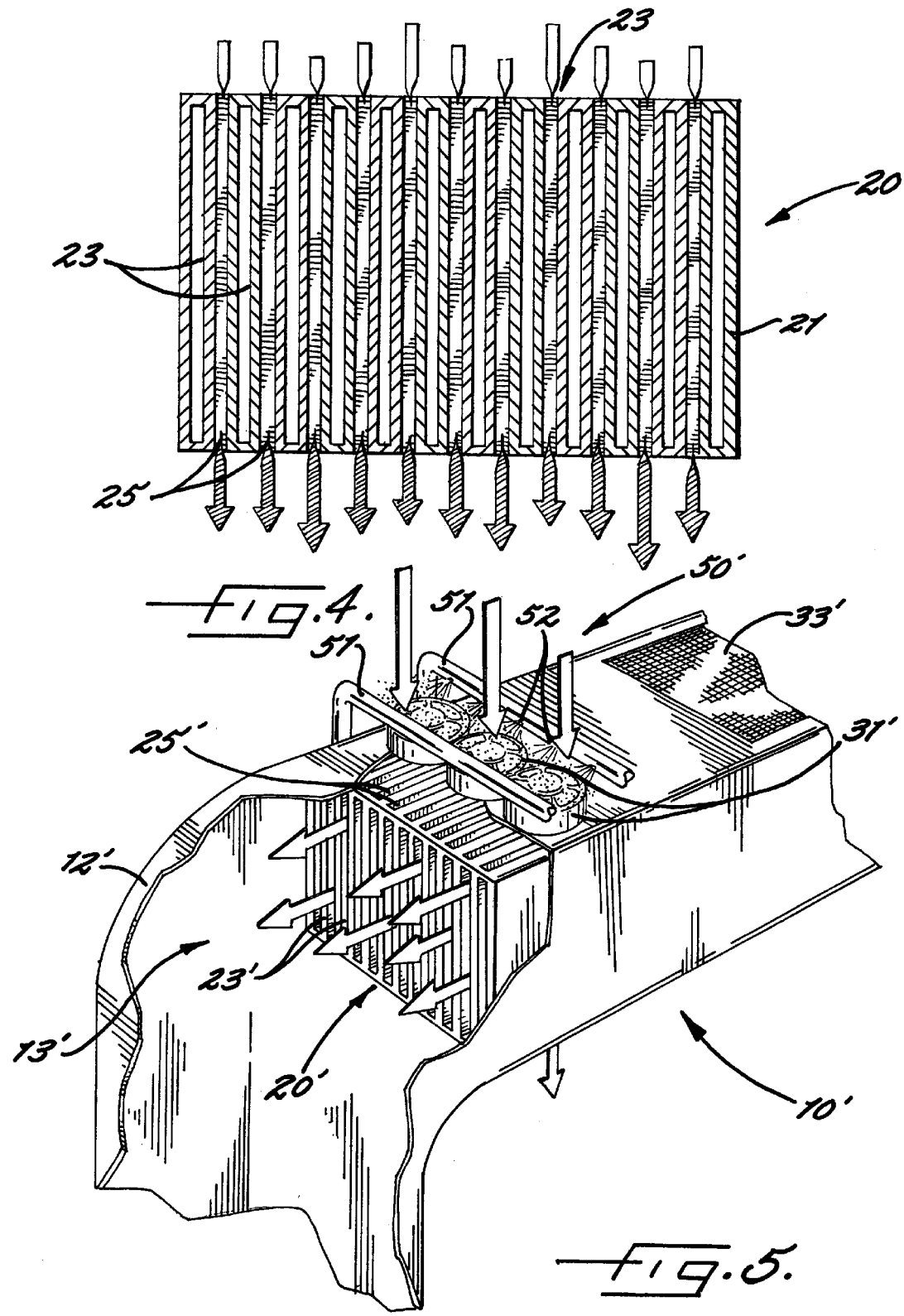

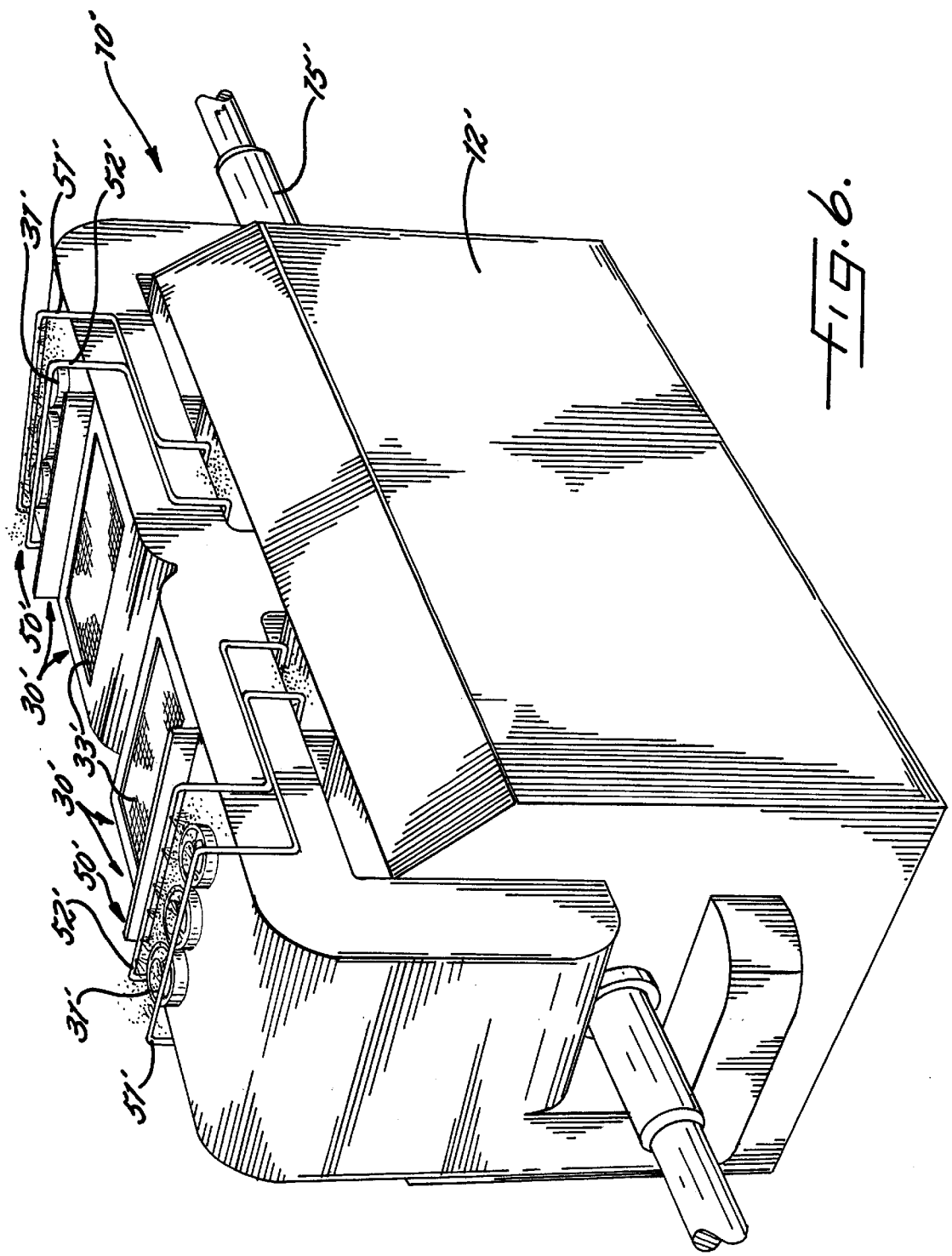

APPARATUS AND METHOD FOR APPLYING TOTALLY ENCLOSED AIR-TO-AIR COOLER TO ELECTRICAL POWER GENERATOR

FIELD OF THE INVENTION

This invention is related to the power generation industry and, more particularly, to the field of electrical power generators.

BACKGROUND OF THE INVENTION

In the power generation industry, air is often used to cool electrical power generators. The systems that are currently provided are generally classified as either open air cooled (OAC) systems or totally enclosed water to air cooled (TEWAC) systems. The OAC system can experience numerous problems. For example, air surrounding the OAC system which is used to cool the power generator can be contaminated or otherwise not as clean as desired. Accordingly, these OAC systems can require one or more filters which add to the cost, maintenance, and complexity of the system. Additionally, OAC systems can be quite noisy. The TEWAC systems, on the other hand, are quite complex and expensive. For example, these TEWAC systems often require another water-to-air cooler to cool the water used in the TEWAC system. These water-to-air coolers also use ambient air to cool the water before it is re-circulated through the generator cooler.

SUMMARY OF THE INVENTION

In view of the foregoing, the present invention advantageously provides an apparatus and method for cooling electrical power generators without the use of ambient air which can be contaminated or quite dirty in some environments. The present invention also advantageously provides an apparatus and method for applying a totally enclosed air-to-air cooler to an electrical power generator which is significantly less complex and less expensive. The present invention further advantageously provides an apparatus and method to cool air-cooled power generators which is significantly less noisy than open air cooled systems and do not require extensive air filters which can be required by open air systems.

More particularly, an apparatus for applying totally enclosed air-to-air cooler ("TEAAC") to a power generator is provided. The apparatus preferably includes a housing, a power generator positioned in the housing so that at least an interstitial space is formed between inner walls of the housing and outer surfaces of the electrical power generator, and air-to-air heat transferring means positioned in fluid communication with air in contact with the power generator and in the interstitial space within the housing for receiving heated air from the power generator and transferringly supplying cooled air thereto.

The air-to-air heat transferring means can advantageously include a heat transfer device having a body, a first plurality of air flow passageways formed in the body to allow relatively hot air received from the power generator to be cooled to flow therethrough in a first predetermined direction, and a second and separate plurality of air flow passageways formed in the body to allow relatively cooler air received from outside of the housing to be heated to flow therethrough in a second predetermined direction without contact or mixing with the relatively hot air.

The present invention also advantageously provides a method for cooling a power generator. The method preferably includes receiving heated air from a power generator positioned within a housing, transferringly cooling the received heated air with cooler air received within the same housing from outside the same housing without mixing the received outside cooler air with the received inside heated air, and supplying cooled air to contact the power generator to thereby cool the power generator.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 2 is a fragmentary perspective view of an apparatus for applying totally enclosed air to an electrical power generator according to a first embodiment of the present invention;

FIG. 3 is vertical sectional view of an electrical power generator having an apparatus for applying totally enclosed air according to a first embodiment of the present invention;

FIG. 4 is a transverse sectional view of an apparatus for applying totally enclosed air to an electrical power generator taken along line 4—4 of FIG. 2 according to a first embodiment of the present invention;

FIG. 5 is fragmentary perspective view of an apparatus for applying totally enclosed air to an electrical power generator according to a second embodiment of the present invention;

FIG. 6 is a perspective view of an electrical power generator having an apparatus for applying totally enclosed air according to a second embodiment of the present invention.

DETAILED DESCRIPTION OF PREFERRED EMBODIMENTS

Figure 1:
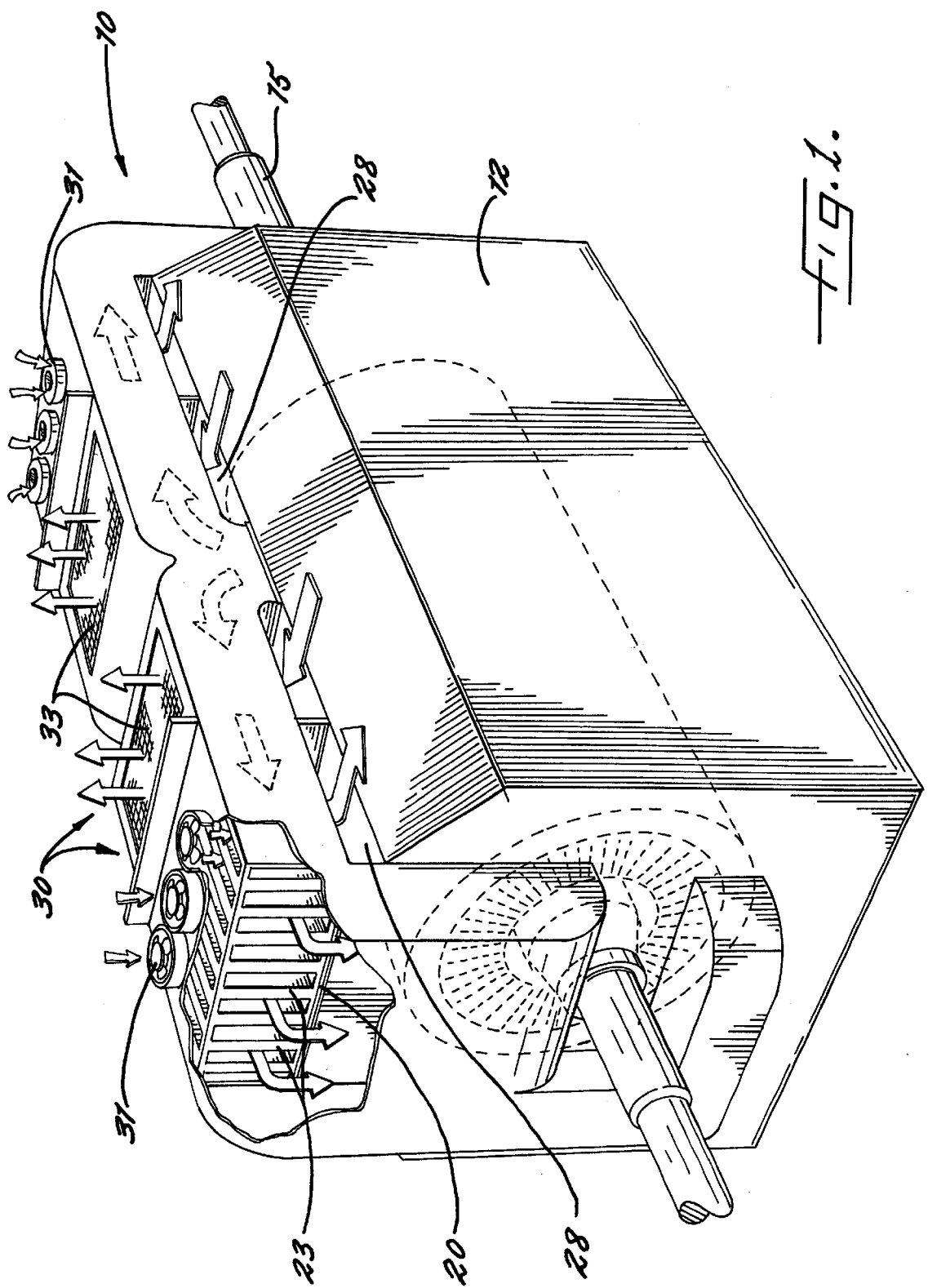
FIG. 1 is a perspective view of an electrical power generator having an apparatus for applying totally enclosed air according to a first embodiment of the present invention.

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation if used indicate similar elements in alternative embodiments.

FIGS. 1, 3, 6, and 7 illustrate embodiments of an apparatus 10 for applying totally enclosed air to a power generator 15 to thereby provide a totally enclosed air-to-air cooled ("TEAAC") power generator. The apparatus 10 preferably has a housing 12, e.g., an outer housing and a power generator 15, e.g., an electrical power generator as well understood by those skilled in the art, positioned in the housing 12 so that at least an interstitial space 13 is formed between inner walls 14 of the housing 12 and outer surfaces 17 of the electrical power generator 15. The apparatus 10 also includes generator mounting means, e.g., preferably provided by a generator frame mount 18 having a plurality of frame members 19, positioned within the housing for mounting the power generator 15 within the housing 12 to thereby allow for the formation of the interstitial space 13. The electrical power generator 15 preferably can also include one or more generator air flow passageways 16 (as perhaps somewhat best shown in FIG. 3) extending through the electrical power generator 15 to thereby further allow air to contact and flow through the electrical power generator 15 and enhance cooling thereof.

The apparatus 10 further preferably includes air-to-air heat transferring means positioned in fluid communication with air contacting the electrical power generator 15 and in the interstitial space 13 within the housing 12 for receiving relatively hot air from the electrical power generator 15, transferringly cooling the relatively hot air with relatively cooler air received from outside the housing 12 without allowing the relatively hot air to contact and mix with the relatively cooler air, and supplying cooled air from within the housing 12 to the power generator 15. By the use of the words "totally enclosed" as used herein, it is meant that the inside air is cooled without contacting and/or mixing with the outside air. Instead, the cooling occurs through heat transfer through an air-to-air heat transfer device 20 as describe further herein. The use of the word "air" herein will be understood by those skilled in the art to include various gases or gaseous mixtures. The present invention, however, advantageously can use outside ambient or environmental air wherever the housing 12 for the power generator 15 is located for various applications.

The air-to-air heat transferring means advantageously includes an air-to-air heat transfer device or cooler 20 having a body 21, a first plurality 23 of air flow passageways formed in the body 21 to allow relatively hot air received from the power generator 15 to be cooled to flow therethrough in a first predetermined direction, and a second and separate plurality of air flow passageways 25 formed in the body 21 to allow relatively cooler air received from outside of the housing 12 to be heated to flow therethrough in a second predetermined direction without contact or mixing with the relatively hot air (see FIGS. 2–4). The second predetermined direction can advantageously be a different direction so that the heat transfer device 20 can be compactly positioned within the housing 12. The heat transfer device 20 can include only a first single air flow passageway and only a second and separate single air flow passageway, but the plurality of air flow passageways 23, 25 as further described herein is much more advantageous in enhancing the cooling capability of the device 20, e.g., volume of air handled and time for cooling the volume of air. Also, notably, one or more of the heat transfer devices 20 can be used within the housing 12 for one or more power generators 15 according to the present invention.

The first plurality of air flow passageways 23 and the second plurality of air flow passageways 25 each preferably have outer peripheries defined by a plurality of common walls 24 of the body 21 so that heat from relatively hot air to be cooled flowing through the first plurality of air flow passageways 23 is transferred through the plurality of common walls 24 to the cool air to be heated flowing through the second plurality of air flow passageways 25. The body 21 of the heat transfer device 20 further includes a plurality of outer wall members 22, and the plurality of common walls 24 preferably are provided by inner walls of the body 21.

The plurality of common walls 24 provide a separation between the outside and inside air to allow the outside air to cool the inside air without contacting and/or mixing the outside and inside air. This allows the apparatus 10 to take advantage of the use of outside air to cool the inside air, e.g., by heat transfer through the common walls 24, without the need for filters for filtering what can be contaminated or dirty outside air. Each of the first and second plurality of air flow passageways 23, 25 can also advantageously be positioned so that air flows in different directions through the passageways (see FIGS. 2 and 4), e.g., upward/downward, right-to-left/left-to-right, or other directional orientations.

The air-to-air heat transferring means further preferably includes at least one air circulator 30 positioned in fluid communication with the second plurality of air flow passageways 25 of the heat transfer device 20 for supplying cool air to the heat transfer device 20 and withdrawing heated air from the second plurality of air flow passageways 25 of the heat transfer device 20. The at least one air circulator 30 is preferably provided by one or more fans 31 (see FIGS. 3 and 5–7) positioned adjacent inlets of the second plurality of air flow passageways 25 and one or more vents 33 positioned adjacent outlets of the second plurality of air flow passageways 25 to allow heated air to flow outwardly from the outlets and out of the housing 12. The body 21 of the air-to-air heat transfer device 20 can also include one or more common air flow chambers 28 such as positioned adjacent the second plurality of air flow passageways 25. The air flow chamber(s) 28 can also have at least one air circulator 35, e.g., provided by one or more fans, positioned to circulate or draw air from the chamber back into the second plurality of air flow passageways 25 (see FIG. 3).

The air-to-air heat transferring means can further advantageously include at least one air circulator 40 positioned within the housing 12, in fluid communication with the first plurality of air flow passageways 23 of the heat transfer device 20, and in fluid communication with air surrounding the electrical power generator 15 to circulate relatively hot air from surrounding the electrical power generator 15 to and through the first plurality of air flow passageways 23 to thereby cool the relatively hot air and supply cooled air from the first plurality of air flow passageways 23 to the electrical power generator 15 to thereby cool the electrical power generator 15 (see FIGS. 2–3). The at least one air circulator 40 is preferably provided by one or more fans 41 positioned to circulate air through at least portions of the interstitial space 13 and through the heat transfer device 20 as shown by the arrows in FIG. 3.

Figure 7:
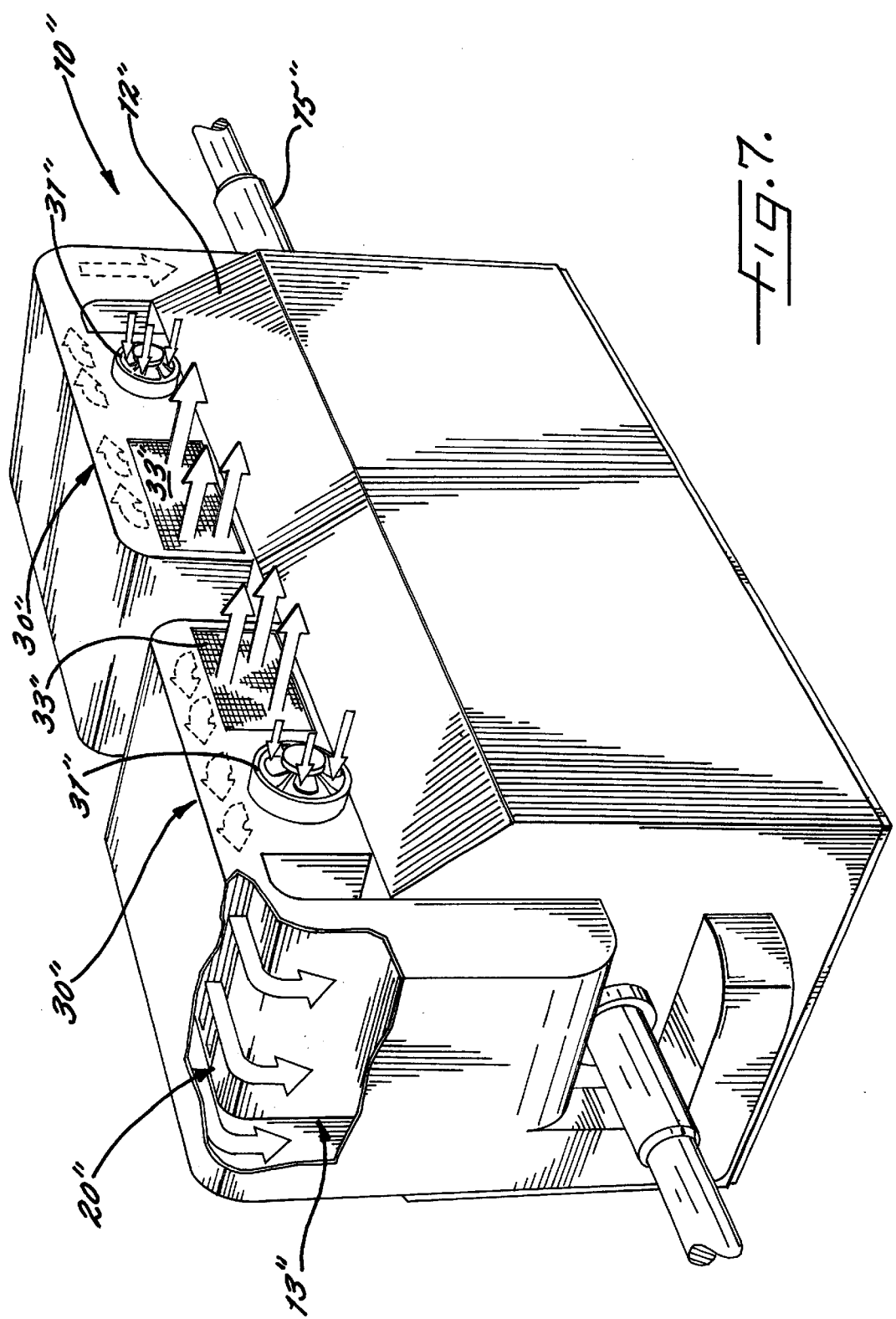
FIG. 7 is a perspective view of an electrical power generator having an apparatus for applying totally enclosed air according to a third embodiment of the present invention.

As perhaps best illustrated in the embodiments of FIGS. 5 and 6, the air-to-air heat transferring means of the apparatus 10' can further include a liquid coolant sprayer 50, e.g., having one or more supply lines 51 and one or more spray nozzles 52 as understood by those skilled in the art, positioned adjacent the at least one air circulator 30' which is positioned adjacent the second plurality of air flow passageways 25' to sprayingly supply droplets of liquid coolant to the cool air to enhance cooling of the air received by the second plurality of air flow passageways 25' to be used to transferringly cool the relatively hot air to be cooled within the first plurality of air flow passageways 23'. This liquid coolant is preferably water, but can be other coolants as well as understood by those skilled in the art. The liquid coolant is preferably sprayed as a mist with the relatively cool air to enhance the cooling of the outside air and thereby also enhance the cooling of the heated inside air circulating through the first plurality of air flow passageways 23'. As shown in the embodiment of FIG. 7, the apparatus 10" can have the at least one air circulator 30" positioned in different locations in the housing 12" with respect to the heat air transfer device 20" according to the present invention.

As illustrated in FIGS. 1–7, the present invention also advantageously includes a method for cooling a power generator 15. The method preferably includes receiving heated air from adjacent a power generator 15 positioned within a housing 12, transferringly cooling the received heated air with cooler air received within the same housing 12 from outside the same housing 12 without contacting or mixing the cooler air with the heated air, and supplying cooled air to contact the power generator 15 to thereby cool the power generator 15.

The method can also include the step of transferringly cooling the received heated air including providing a heat transfer device 20 having a body 21, a first plurality of air flow passageways 23 formed in the body 21 for receiving the heated air from the power generator 15 to allow heated air to be cooled to flow therethrough in a first predetermined direction, and a second and separate plurality of air flow passageways 25 formed in the body 21 for receiving cooler air from outside of the housing 12 to allow cooler air to be heated to flow therethrough in a second predetermined direction. The first plurality of air flow passageways 23 and the second plurality of air flow passageways 25 preferably each have outer peripheries defined by a plurality of common walls 24 of the body 21 so that heat from the relatively hotter air received from the power generator 15 and flowing through the first plurality of air flow passageways 23 is transferred through the plurality of common walls 24 to the relatively cooler air received from outside of the housing 12 and flowing through the second plurality of air flow passageways 25. Also, the step of transferringly cooling the relatively hot air can include the steps of circulating, e.g., preferably continuously during operation of the power generator 15, the relatively hot air received from the power generator 15 through the first plurality of air flow passageways 23 and circulating, e.g., preferably continuously during operation of the power generator 15, the relatively cooler air received from outside of the housing 12 through the second plurality of air flow passageways 25.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. An apparatus for applying totally enclosed air to an electrical power generator, the apparatus comprising:
   a housing;
   an electrical power generator positioned in said housing so that at least an interstitial space is formed between inner walls of said housing and outer surfaces of the electrical power generator; and
   air-to-air heat transferring means positioned in fluid communication with air contacting the electrical power generator and in the interstitial space within said housing for receiving relatively hot air from the electrical power generator, transferringly cooling the relatively hot air with relatively cooler air received from outside the housing without allowing the relatively hot air to contact and mix with the relatively cooler air, and supplying cooled air from within said housing to the power generator, the air-to-air heat transferring means including:
      a heat transfer device having a body, a first plurality of air flow passageways formed in the body to allow relatively hot air received from the electrical power generator to be cooled to flow therethrough in a first predetermined direction;
      a second and separate plurality of air flow passageways formed in the body to allow relatively cooler air received from outside of the housing to be heated to flow therethrough in a second predetermined direction without contact or mixing with the relatively hot air;
      at least one air circulator positioned in fluid communication with the heat transfer device for supplying cool air to the heat transfer device and withdrawing heated air from the heat transfer device; and
      a liquid coolant sprayer positioned adjacent the at least one air circulator to sprayingly supply droplets of liquid coolant to the cool air to enhance cooling of the air received by the second plurality of air flow passageways to be used to transferringly cool the relatively hot air to be cooled within the first plurality of air flow passageways.

2. An apparatus as defined in claim 1, wherein the liquid coolant supplied from the liquid coolant sprayer comprises water.

3. An apparatus for applying air to cool an electrical power generator, the apparatus comprising:
   a housing;
   a power generator positioned in said housing;
   a heat transfer device positioned within said housing and adjacent and in fluid communication with air contacting the power generator to receive relatively hot air from the electrical power generator, transferringly cooling the relatively hot air with relatively cooler air received from outside the housing without allowing the relatively hot air to contact and mix with the relatively cooler air, and supplying cooled air from within said housing to the power generator,
   wherein the heat transfer device has a body, a first plurality of air flow passageways formed in the body to allow air to be cooled to flow therethrough in a first predetermined direction and a second and separate plurality of air flow passageways formed in the body to allow air to be heated to flow therethrough in a second predetermined direction,
   wherein the first plurality of air flow passageways and the second plurality of air flow passageways each have outer peripheries defined by a plurality of common walls of the body so that heat from relatively hot air to be cooled by flowing through the first plurality of air flow passageways is transferred through the plurality of common walls to the cool air to be heated by flowing through the second plurality of air flow passageways,
   wherein the body of the heat transfer device further includes a plurality of outer wall members, and wherein the plurality of common walls comprise inner walls of the body, wherein the power generator includes at least one generator flow passageway extending therethrough, and the apparatus further comprising a generator frame mount positioned within said housing for mounting the power generator within said housing to thereby allow air to circulate around the power generator; and
   a first air circulator positioned in fluid communication with said second plurality of air flow passageways of said heat transfer device for supplying relatively cooler air from outside said housing to said heat transfer device and withdrawing heated air from said second plurality of air flow passageways and a second air circulator positioned within said housing, in fluid communication with the first plurality of air flow passageways of the heat transfer device, and in fluid communication with air surrounding the power generator to circulate relatively hot air from surrounding the power generator to and through the first plurality of air flow passageways to thereby cool the relatively hot air and supply cooled air from the first plurality of air flow passageways to the power generator to thereby cool the power generator.

4. An apparatus as defined in claim 3, further comprising a liquid coolant sprayer positioned adjacent the at least one air circulator to sprayingly supply droplets of liquid coolant to the cool air received by said second plurality of air flow passageways to enhance cooling of the air to be used to transferringly cool the relatively hot air to be cooled within said first plurality of air flow passageways.

5. An apparatus for applying totally enclosed air to an electrical power generator, the apparatus comprising:

a housing;

an electrical power generator arranged in the housing so that an interstitial space is formed between at least a portion of the housing and at least a portion of the electrical power generator; and an air-to-air heat transfer device arranged in fluid communication with relatively hot air contacting the electrical power generator and with relatively cool air outside the housing, the heat transfer device having a first air flow passageway in which the relatively hot air flows and a second air flow passageway in which the relatively cool air flows, the relatively hot air and the relatively cool air being isolated from each other; and an air circulator positioned between the air received from outside the housing and the interstitial space formed between the housing and the electrical power generator.

6. An apparatus as defined in claim 5, wherein the air circulator is sized and configured to blow air into the heat transfer device.

7. An apparatus as defined in claim 5, wherein the air circulator is sized and configured to withdraw air from the heat transfer device.

8. An apparatus as defined in claim 5, wherein the heat transfer device has a plurality of first air flow passageways and a plurality of second air flow passageways, at least one of the first and second air flow passageways having a common wall.

9. An apparatus as defined in claim 5, wherein a coolant device is arranged near the air circulator to cool to the relatively cool air.

10. An apparatus as defined in claim 9, wherein the coolant device is arranged near the air circulator to provide liquid coolant to the relatively cool air to enhance cooling of the relatively cool air, the air circulator being at least one fan.

* * * * *